United States Patent
Feng et al.

(10) Patent No.: US 8,522,328 B2
(45) Date of Patent: Aug. 27, 2013

(54) MEASUREMENT DEVICE AND METHOD FOR LOGGING USE OF THE MEASUREMENT DEVICE

(75) Inventors: Jun-Yang Feng, Shenzhen (CN); Fa-Sheng Huang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 46 days.

(21) Appl. No.: 13/221,924

(22) Filed: Aug. 31, 2011

(65) Prior Publication Data

US 2012/0110653 A1    May 3, 2012

(30) Foreign Application Priority Data

Oct. 28, 2010    (CN) .......................... 2010 1 0523167

(51) Int. Cl.
H04L 29/00    (2006.01)
(52) U.S. Cl.
USPC ............... 726/7; 713/155; 713/156; 713/157; 713/158; 713/159; 713/182; 713/183; 713/184; 713/185; 713/186

(58) Field of Classification Search
USPC .......................... 713/182–186; 380/247–250
See application file for complete search history.

(56) References Cited

U.S. PATENT DOCUMENTS

2010/0263055 A1* 10/2010 Habif .............................. 726/27
2011/0016517 A1*  1/2011 Kasahara et al. ................. 726/7

* cited by examiner

Primary Examiner — Phillip J. Chea
Assistant Examiner — Ghazal Shehni
(74) Attorney, Agent, or Firm — Altis Law Group, Inc.

(57) ABSTRACT

In a method for managing use information of a measurement device, an operating interface of the device is locked before the device is operated. When a user starts to use the device, the method provides a login interface to verify whether the user is authorized to login the operating interface. If the user is authorized to login the operating interface, the operating interface is unlocked and the method records first information of starting to operate the device. After finishing the operation or when an elapsed time of the device not in use is greater than a predetermined time, the method controls the user to log out the operating interface, records second information of finishing the operation, and the operating interface is locked. The first information and the second information are saved in a text file.

12 Claims, 3 Drawing Sheets

MEASUREMENT DEVICE AND METHOD FOR LOGGING USE OF THE MEASUREMENT DEVICE

BACKGROUND

1. Technical Field

Embodiments of the present disclosure generally relate to measurement devices, and more particularly to a measurement device and a method for logging or tracking use of the measurement device.

2. Description of Related Art

Industrial equipment, such as measurement devices, need to be maintained and calibrated on a regular basis. To determine when maintenance or calibration is due, a log may be kept by operators of the devices to track the number of hours and/or number of times a particular device is used. However, operators may not always be relied on to timely and accurately log their use of equipment. Therefore, a method for automatically logging equipment use is desired.

DETAILED DESCRIPTION

In general, the word "module," as used hereinafter, refers to logic embodied in hardware or firmware, or to a collection of software instructions, written in a programming language, such as, for example, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
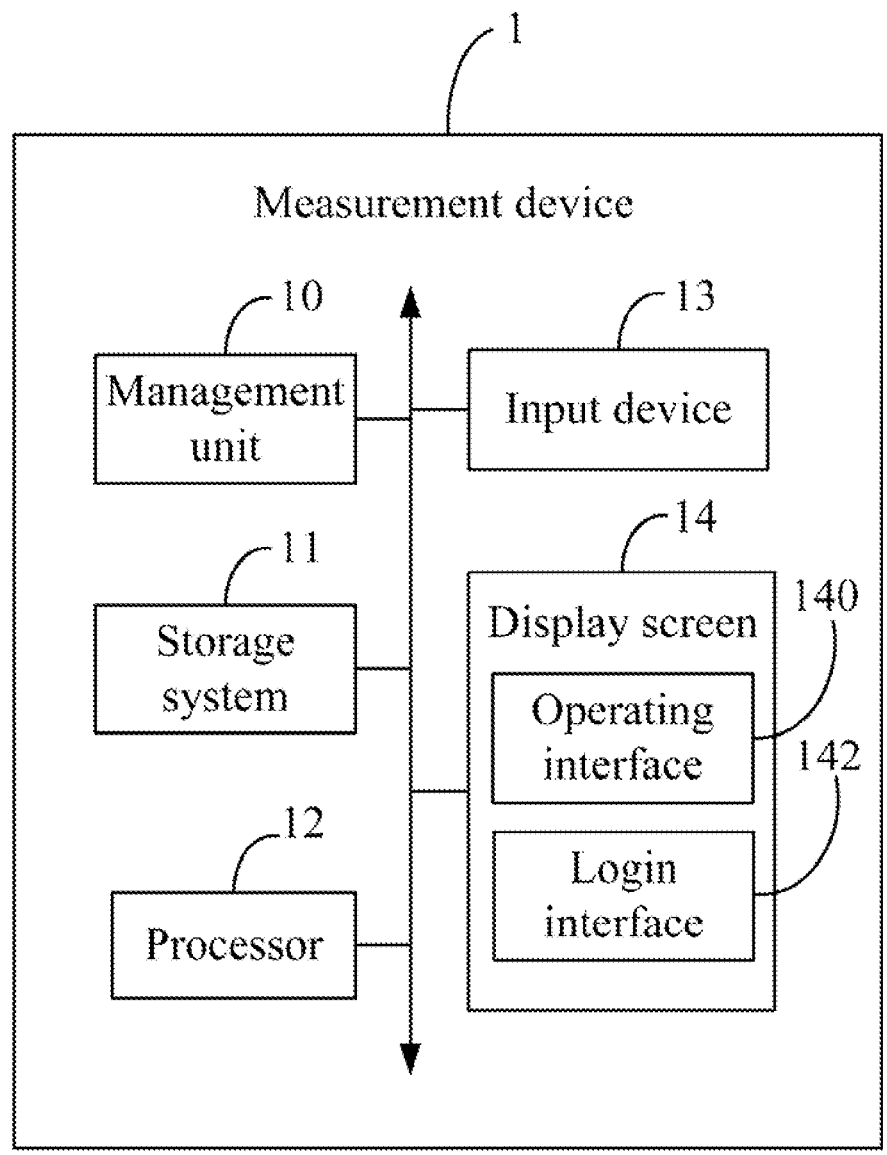
FIG. 1 is a block diagram of one embodiment of a measurement device including a management unit.

FIG. 1 is a block diagram of one embodiment of a measurement device 1 including a management unit 10. In the embodiment, the functions of the management unit 10 are implemented by the device 1. The management unit 10 can record use of the device 1, and manage the records to determine maintenance schedule for the device 1. Detail functions of the unit 10 are described, in reference to FIG. 2, below.

In one embodiment, the device 1 may be an electronic measuring instrument (e.g., an oscillograph) that comprises, in addition to hardware items, computerized code in the form of one or more programs that are stored in a storage system 11, and executed by a processor 12 of the device 1.

In one embodiment, the storage system 11 may be a magnetic or an optical storage system, such as a hard disk drive, an optical drive, a compact disc, a digital video disc, a tape drive, or other suitable storage medium. The storage system 11 is further used for storing user identifiers (IDs) and corresponding passwords to limit use of the device 1 to authorized users.

The device 1 further includes an input device 13 and a display screen 14. The input device 13 may be a keyboard, or function buttons of the device 1. The input device 13 may be used to receive user input, such as a user ID and a password of a user of the device 1. The display screen 14 provides an operating interface 140, such as a control panel of the device 1, and further provides a login interface 142 to prompt input of the user ID and the password from the user.

Figure 2:
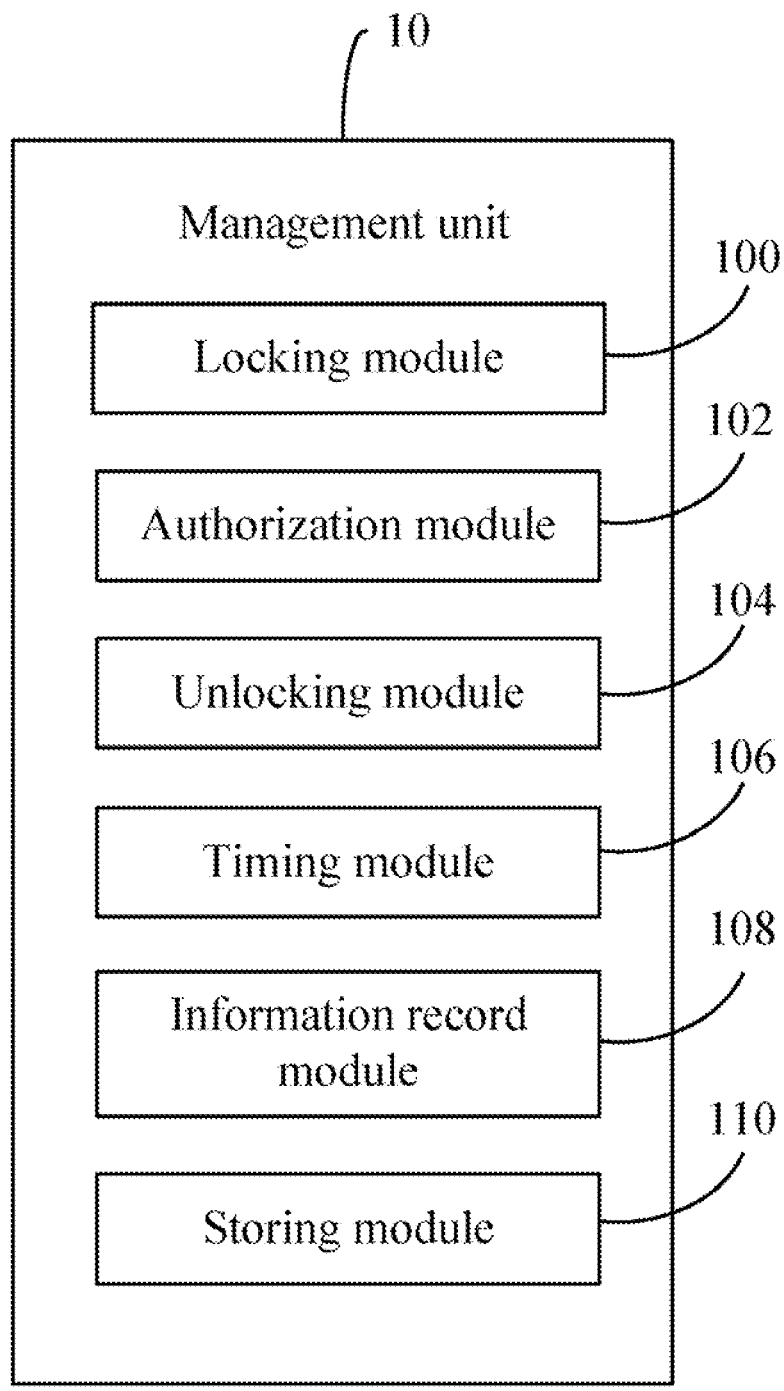
FIG. 2 is block diagram of one embodiment of function modules of the management unit in FIG. 1.

FIG. 2 is block diagram of one embodiment of function modules of the management unit 10 in FIG. 1. In one embodiment, the management unit 10 includes an interface locking module 100, an authorization module 102, an interface unlocking module 104, a timing module 106, an information record module 108, and a storing module 110. Each of the modules 100-110 may be a software program including one or more computerized instructions that are stored in the storage system 11 and executed by the processor 12. The processor 12 may be a central processing unit or a math co-processor, for example.

Before the user begins to operate the device 1, the interface locking module 100 may lock the operating interface 140 of the device 1. In the embodiment, the operating interface 140 may include a locked state and an unlocked state. The locked and unlocked states are defined as interface accessible states of the device 1, meaning that accessibility to the device 1 are determined by the operating interface 140 being either in the unlocked or locked state. In the locked state, the operating interface 140 of the device 1 cannot be accessed or used by a user. In the unlocked state, the operating interface 140 of the device 1 can be accessed or used by a user. In one example, to go from the locked state to the unlocked state, a security code, such as a password and user ID, must be input to the login interface 142. The authorization module 102 can provide the login interface 142 on the display screen 14 to prompt input of a user ID and a password from the user on the input device 13, and verify whether the user is authorized to use the device 1.

If the input user ID matches a predefined user ID and the input password matches a predefined password stored in the storage system 11, the authorization module 102 determines that the user is authorized to operate the device 1. The interface unlocking module 104 then unlocks the operating interface 140 and records a first information of the device 1 usage in a text file of the storage system 11. In the embodiment, the first information includes a time that the operating interface 140 was unlocked, the input user ID, the input password, and status parameters of the device 1 after the operating interface 140 of the device 1 is unlocked. The time that the operating interface 140 is unlocked represents a start time of operating the device 1. Since the device 1 may be calibrated after each time of operation on the device 1, the calibration time of the device 1 can be recorded as the status parameters in the first information. In the embodiment, the status parameters further include a temperature difference of the device 1 before and after the last calibration, for example.

The timing module 106 times idle periods of the device 1. When the device 1 is idle longer than a predetermined time, the timing module 106 notifies the record module 18. In one embodiment, the predetermined time may be one minute, two minutes, or other values preset in the storage system 11.

If the device 1 is idle longer than the predetermined time, it is assumed the current operator is done using the device 1, and the information record module 108 logs out of the operating interface 140, locks the operating interface 140, and records a second information of the device 1 usage in the text file of the storage system 11. In the embodiment, the second information includes a time that the operating interface 140 was logged out, the user ID and the password of the user, and status parameters of the device 1 during the logout of the operating interface 140. In one embodiment, the status parameters of the device 1 during the logout of the operating interface 140 may include the calibration time of the device 1 after this operation, and a temperature difference of the device 1 before and after the calibration time, for example.

The storing module 110 saves the text file in the storage system 11.

Figure 3:
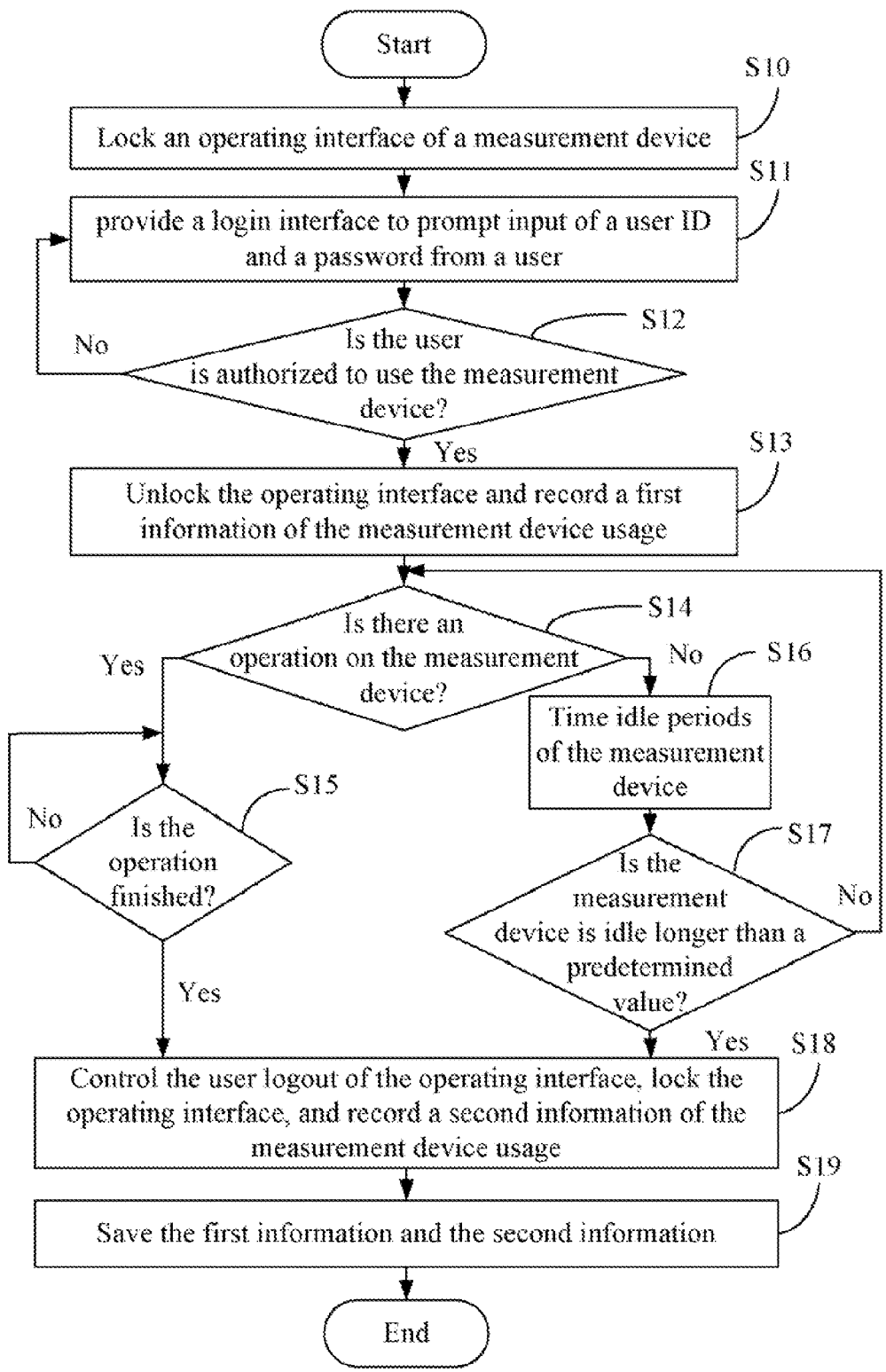
FIG. 3 is a flowchart illustrating one embodiment of a method for managing use information of the measurement device of FIG. 1.

FIG. 3 is a flowchart illustrating one embodiment of a method for managing use information of the device 1 in FIG. 1. The method can be performed by execution of a computer-readable program by at least one processor 12 of the device 1. Depending on the embodiment, in FIG. 3, additional blocks may be added, others removed, and the ordering of the blocks may be changed.

In block S10, the interface locking module 100 locks an operating interface 140 of the device 1 when the device 1 is to be operated. In the embodiment, the operating interface 140 is locked by the interface locking module 100 when the device 1 is first operated.

In block S11, the authorization module 102 provides a login interface 142 to prompt input of a user ID and a password from a user. The login interface 142 is presented for receiving the user ID and the password from the input device 13 when the operating interface 140 is locked.

In block S12, the authorization module 102 verifies whether the user is authorized to use the device 1. If the input user ID matches a predefined user ID and the input password matches a predefined password stored in the storage system 11, the authorization module 102 determines that the user is authorized to operate the device 1, block S13 is implemented. If no predefined user ID and password stored in the storage system 11 matches the input user ID and the input password, the authorization module 102 determines that the user is not authorized to use the device 1, block S11 is repeated.

In block S13, the interface unlocking module 104 unlocks the operating interface 140 and records a first information of the start of the device 1 usage. In the embodiment, the first information includes a time that the operating interface 140 was unlocked, the input user ID and the input password, and status parameters of the device 1 after the operating interface 140 of the device 1 is unlocked. The status parameters may include a calibration time of the device 1 after the last operation on the device 1, and a temperature difference of the device 1 before and after the calibration time of the last operation, for example.

In block S14, the timing module 106 detects whether there is an operation on the device 1. If there is an operation on the device 1, in block S15, the timing module 106 detects whether the device 1 is finished with the operation. If the operation is finished, block S18 is implemented. Otherwise, if the operation is not finished, block S15 is repeated.

If there is no operation on the device 1, in block S16, the timing module 106 times idle periods of the device 1. In block S17, the timing module 106 detects whether the device 1 is idle longer than the predetermined time. If the device 1 is idle longer than the predetermined time, block S18 is implemented. If the device 1 is not idle longer than the predetermined time, the flow returns block S14. In one embodiment, the predetermined time may be one minute, two minutes, or other values preset in the storage system 11.

In block S18, the information record module 108 controls the user log out the operating interface 140 and locks the operating interface 140, records a second information of the end of the device 1 usage.

In the embodiment, the second information includes a time that the operating interface 140 was logged out, the user ID and the password of the user, and status parameters of the device 1 during the logout of the operating interface 140. In one embodiment, the status parameters of the device 1 during the logout of the operating interface 140 may include a calibration time of the device 1 after this operation, and a temperature difference of the device 1 before and after the calibration time of this operation, for example.

In block S19, the storing module 110 saves the first information and the second information of the device 1 in a text file, and stores the text file in the storage system 11.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method for managing use information of a measurement device, the method comprising:

locking an operating interface of the measurement device before the measurement device is operated;

providing a login interface on a display screen of the measurement device to prompt input of a user ID and a password from a user, and verifying whether the user is authorized to use the measurement device;

in response to the verification that the user is authorized to use the measurement device, unlocking the operating interface and recording a first information of the measurement device in a text file;

controlling the user to log out the operating interface and locking the operating interface when the measurement device is finished with an operation or the measurement device is idle longer than a predetermined time;

recording a second information of the measurement device and status parameters of the measurement device in the text file, wherein the status parameters comprise a calibration time of the measurement device after the operation on the measurement device and a temperature difference of the measurement device before and after the calibration time of the operation, and wherein the first information is different from the second information;

and storing the text file in a storage system of the measurement device.

2. The method as described in claim 1, further comprising: detecting whether the measurement device is finished with the operation.

3. The method as described in claim 1, wherein the first information comprise a time that the operating interface was unlocked, the user ID, and the password.

4. The method as described in claim 1, wherein the second information comprise a time that the operating interface was logged out, the user ID, and the password.

5. A measurement device, comprising: a display screen; at least one processor; a storage system; and one or more software modules that are stored in the storage system and executed by the at least one processor, the one or more software modules comprising:

an interface locking software module operable to lock an operating interface of the measurement device before the measurement device is to be operated;

an authorization software module operable to provide a login interface on the display screen to prompt input of a user ID and a password from a user, and verify whether the user is authorized to use the measurement device;

an interface unlocking software module operable to unlock the operating interface and recording a first information of the measurement device in a text file, upon the condition that the user is authorized to use the measurement device;

an information record software module operable to control the user to log out the operating interface and locking the operating interface when an operation of the measurement device is finished or the measurement device is idle longer than a predetermined time, and record a second information of the measurement device and status parameters of the measurement device in the text file, wherein the status parameters comprise a calibration time of the measurement device after the operation on the measurement device and a temperature difference of the measurement device before and after the calibration time of the operation, and wherein the first information is different from the second information; and a storing module operable to store the text file in the storage system.

6. The measurement device as described in claim 5, further comprising a timing software module operable to detect whether the measurement device is finished with the operation, and detect whether the measurement device is idle longer than the predetermined time.

7. The measurement device as described in claim 5, wherein the first information comprise a time that the operating interface was unlocked, the user ID, and the password.

8. The measurement device as described in claim 5, wherein the second information comprise a time that the operating interface was logged out, the user ID, and the password.

9. A non-transitory storage medium having stored thereon instructions that, when executed by a processor of a measurement device, causes the processor to perform a method for managing use information of the measurement device, the method comprising:

locking an operating interface of the measurement device before the measurement device is operated;

providing a login interface on a display screen of the measurement device to prompt input of a user ID and a password from a user, and verifying whether the user is authorized to use the measurement device;

in response to the verification that the user is authorized to use the measurement device, unlocking the operating interface and recording a first information of the measurement device in a text file;

controlling the user to log out the operating interface and locking the operating interface when the measurement device is finished an operation or the measurement device is idle longer than a predetermined time;

recording a second information of the measurement device and status parameters of the measurement device in the text file, wherein the status parameters comprise a calibration time of the measurement device after the operation on the measurement device and a temperature difference of the measurement device before and after the calibration time of the operation, and wherein the first information is different from the second information; and storing the text file in a storage system of the measurement device.

10. The non-transitory storage medium as described in claim 9, wherein the method further comprises:

detecting whether the measurement device is finished with the operation.

11. The non-transitory storage medium as described in claim 9, wherein the first information comprise a time that the operating interface was unlocked, the user ID, and the password.

12. The non-transitory storage medium as described in claim 9, wherein the second information comprise a time that the operating interface was logged out, the user ID, and the password.

* * * * *